April 10, 1973     O. GLAV     3,726,706

EXCHANGER PACKING

Filed Feb. 11, 1970

INVENTOR

Sol B. Wiczer
ATTORNEY

United States Patent Office 3,726,706
Patented Apr. 10, 1973

3,726,706
EXCHANGER PACKING
Ola Glav, Vallentuna, Sweden, assignor to Aktiebolaget Carl Munters, Sollentuna, Sweden
Continuation-in-part of application Ser. No. 561,705, June 30, 1966, which is a continuation-in-part of application Ser. No. 531,068, Mar. 2, 1966. This application Feb. 11, 1970, Ser. No. 10,471
The portion of the term of the patent subsequent to Mar. 10, 1987, has been disclaimed
Int. Cl. B44d 1/48; C03c 25/02
U.S. Cl. 117—62
4 Claims

ABSTRACT OF THE DISCLOSURE

Exchanger packings of corrugated laminated asbestos through which gases are passed for heat or moisture exchange are strengthened by dipping the fiber board sheets, or packing formed from such sheets, into an inorganic soluble salt solution, the excess liquid being drained and then precipitating the salt component upon the fibers of the packing by reacting with a gaseous medium. The inorganic salt is typically water glass, and the precipitating gas is typically carbon dioxide, sulfur trioxide, chlorine or the like.

---

Figure 1:
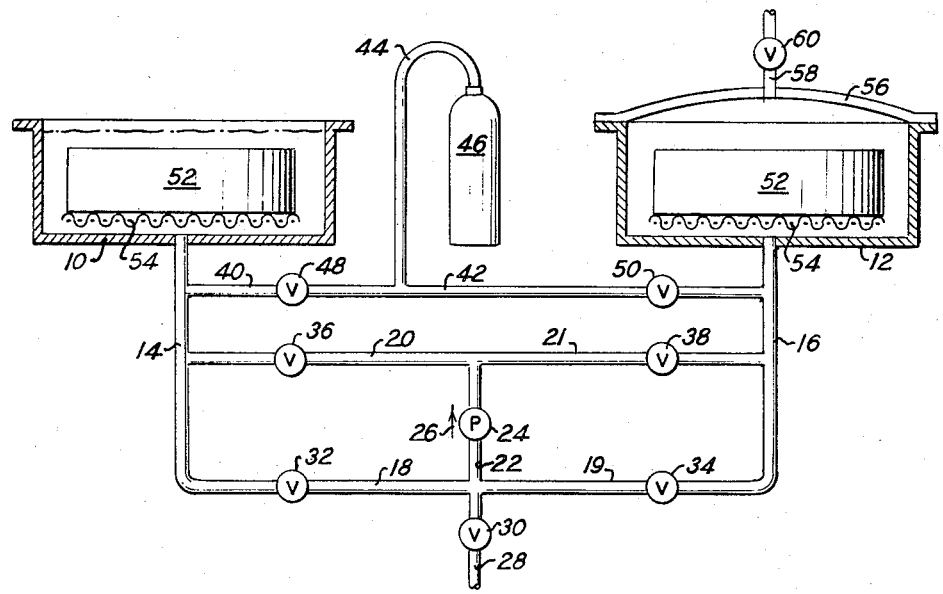

The present invention is a continuation-in-part of my copending application Ser. No. 561,705, filed June 30, 1966 and now Pat. No. 3,499,812 issued Mar. 10, 1970, in turn a continuation-in-part of application Ser. No. 531,068, filed Mar. 2, 1966, and now abandoned, relates to a method of manufacture of an exchanger packing for transfer of moisture and/or heat. Such packing is composed of thin corrugated layers or sheets which directly or possibly indirectly by means of separating sheets or distance pieces bear against one another at mutually spaced places such as at the ends of each corrugation and therebetween form passages open from end to end of the packing. Usually, at least every second layer or sheet is corrugated, the places of mutual contact of the layers then being formed by the ridges of the corrugations.

For utilization in an important field of application of the invention, the layers are made of foils, or sheets of a fibrous material, as is the case with asbestos. An essential field of use of the invention is the transfer of moisture and/or heat between two air currents. For this purpose, the exchanger packing may have the structure of a rotor adapted to move along a closed path between two passages passed by the two air currents.

It is known to increase the wet strength by treating sheets of fibrous material with substances which together produce an insoluble deposit on the sheets or fibers. As an example for such known substances, water glass and calcium chloride may be mentioned which in aqueous solution react with one another to form calcium silicate. According to one method of treatment, the exchanger packing is initially immersed into the solution of water glass and subsequently, after the excess of said solution has had time to flow off from the layers, the packing is then immersed into the solution of calcium chloride.

In these known methods thus all components are in the liquid state during the treatment. A result is that the first liquid agent, with which the layer has been impregnated, is partially mechanically displaced when immersion is effected in the second liquid so that it will be distributed in an uneven manner over the layer surfaces and is partly lost. The first liquid component does not have time to react with the second liquid component to form the unsoluble deposit prior to its mechanical displacement. The result will be that the layers of the exchanger packing will be given an uneven distribution of the deposit and in connection therewith locally different hardnesses.

It is one main object of the invention to eliminate this drawback and thus to provide an exchanger packing in which the layers have a high mechanical strength over their entire surface extension, especially in wet state. That wet strength feature is of particular interest when the exchanger packing during its operation comes into contact with a liquid such as water. That effect is substantially obtained according to the present invention when one of the components is in the state of a liquid solution, such as water glass, and the other in the state of a gas reactive with the water glass to insolubilize it, such as carbon dioxide. The gas does not mechanically exercise any action on the liquid component to affect its surface distribution over the layer surfaces of the exchanger packing. However, such gas reacts with the water glass to form an insoluble deposit on the layers which retains its even distribution throughout. Since a greater quantity of the water glass component is utilized in a more effective manner for providing the reinforcing deposit, none being displaced by the gas, the concentration of the water glass in the liquid can be reduced considerably.

Figure 2:
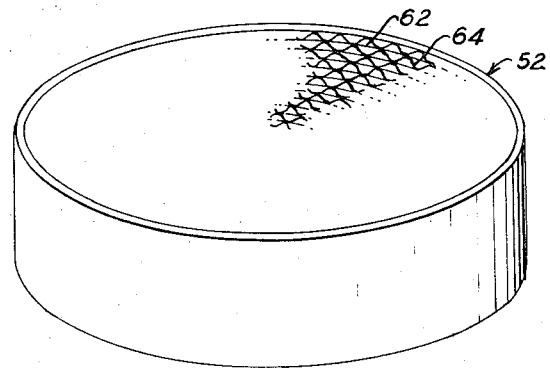

Further objects and advantages of the invention will become apparent from the following description, considered in connection with the accompanying drawing which forms part of this specification and of which:

FIG. 1 is a vertical cross-sectional view of an apparatus for carrying out the method of the invention, and FIG. 2 is a perspective view of an exchanger packing.

Referring to the drawing, and in particular to FIG. 1, reference numerals 10 and 12 denote two top-opened containers or vessels of suitably identical constructions. Conduits 14 and 16, respectively, which are interconnected by means of two conduits 18, 19, and 20, 21, respectively, extend from the bottoms of said containers. The conduits 18, 19 and 20, 21, respectively, are in turn interconnected by means of a conduit 22 including a pump 24, the pumping direction of which is indicated by the arrow 26. The liquid component such as the solution of water glass is supplied to said system of conduits from a storage container (not shown) through a conduit 28 controlled by a valve 30. Valves 32, 34 are mounted in the conduits 18, 19 on each side of their place of connection to the conduit 22. Further, valves 36, 38 are arranged in the conduits 20 and 21, on both sides of their connection to the conduit 22.

In addition, conduits 40, 42 interconnecting with the vertical conduits 14, 16 are over a conduit 44 connected to a pressure container 46 for the gaseous component which may be carbon dioxide. Each conduit 40, 42 is controlled by its valve 48 and 50, respectively.

For treatment according to the invention, an exchanger body 52 is placed into each of the containers 10, 12 on grates 54 which permit passage of the components in consideration. A lid 56 provided with a gas outlet 58 controlled by a valve 60 has for its object alternately to close one of the containers which in FIG. 1 is the container 12.

The exchanger packing 52, which may have the form of a rotor, although this is not a condition, is composed of thin sheets or foils having a thickness of a few tenths of a millimeter, at the utmost. These foils are entirely or partly by corrugation or in some other suitable manner formed to bear against one another at mutually spaced places so that the corrugations each form flow passages open from end to end. In the embodiment shown in FIG. 2, the exchanger packing is composed of alternately plane sheets 62 and corrugated sheets 64. The spacing between the plane sheets is preferably less than 3 mm. such as on the order of 1.0 mm. to 2.0 mm., when an exchanger packing for dehydration or change of temperature of one air current by means of another air or gas current is in consideration. The bonding together of the sheets or foils at the places of contact may be effected by conventional methods and gluing agents of organic or inorganic kinds, such for example as water glass. If the packing is assembled of so-called single-facers, which are wound helically in layers one upon the other, the one plane sheet and the one corrugated strip of the layer may be bonded together by means of water glass or the like in the machine for manufacture of the single-facer. The individual layers of the assembled single-facer may then be glued to one another by the treatment according to the invention. According to an important embodiment of the invention, the sheets or foils are made of asbestos or some other fibrous or filamentaceous material, which preferably is non-metallic.

In operation of the apparatus illustrated in FIG. 1, one exchanger packing 52 is subjected to the first step of treatment in chamber 10 and, simultaneously another exchanger packing 52 to the second step of treatment in chamber 12 according to the invention. Thus, the container 10 is filled with a solution of water glass, so that this solution covers the exchanger packing 52 immersed therein and resting on the grate 54. Thus in the first step a thorough impregnation of the sheet of the exchanger packing with water glass solution is effected. The container 12 houses another exchanger packing 52 which in the preceding step of the procedure was thoroughly impregnated with water glass solution. In the second step, in chamber 12, carbon dioxide is introduced from the pressure container 46 through the conduits 44, 42 and the open valve 50. The valve 60 of chamber 12 also is open, all other valves being closed. The carbon dioxide, which is heavier than air, penetrates upwards into the container 12 and through the fine passages of the exchanger packing 52 simultaneously expelling the air from the container 12 through the conduit 58. The carbon dioxide reacts with the wet water glass solution so as to cause insoluble silicic acid to be deposited on the fibers of the sheets in the exchanger packing and which dries to silica gel.

Thereafter, the exchanger body 52 is removed from the container 12 and rinsed with water, removing water soluble sodium carbonate which has been formed simultaneously with the silicic acid. Thereupon, the exchanger packing may be subjected to the action of heat by means of heated air or a heated gas as is described in the U.S. patent specification No. 3,231,409. Thus, gelatinous water adsorptive silicon dioxide is stabilized in its solid state and at the same time organic binding agents present in the asbestos, may be burnt off, as is described more in detail in the patent specification referred to.

The liquid component may be alternately pumped between the two containers 10, 12 by means of the conduit system described above, the direction of flow through the pump 24 remaining unchanged. After treatment, a new exchanger packing 52 is introduced into the container 12 and the valve 50 is closed, and the valves 32, 38 are opened so that the pump 24 transports the liquid content of the container 10 to the container 12 through the conduit 14, the conduit 18, the conduit 22 and the pump 24, the conduit 21 and the conduit 16. Thereupon, the valves 32 and 38 are closed and after that the lid 52 has been placed on the top of the container 10, carbon dioxide is supplied to said container, after that the valve 48 has been opened.

The pumping over of the liquid component such as the water glass solution, from the container 12 back to the container 10 will take place upon opening of the valves 34, 36. In response to the consumption of the solution, fresh solution is supplied from the storage container connected to the conduit 28.

The gaseous component may also consist of sulfur trioxide or phosphorous pentoxide, and the liquid component, instead of water glass, may be calcium chloride or magnesium chloride, or the like. The carbon dioxide or phosphorous pentoxide reacts with the calcium chloride to give an insoluble deposit. Barium chloride may be used to react with sulfur trioxide to form an insoluble deposit. As another alternative, other soluble silicate solutions such as potassium or lithium can be used to react with carbon dioxide. Carbon dioxide is preferred as the gaseous component, because it is non-toxic in low concentrations.

Any gas precipitatable insoluble reinforcing substance capable of fulfilling its reinforcing effect in the exchanger packing during a longer time of operation is intended to be included. The number of exchanger packings simultaneously treated in the one and the other of the containers 10 and 12, respectively, may be more than one.

It is accordingly intended that such modifications as are within the shell of the art are intended to be included in this invention.

What is claimed is:

1. The method of increasing the wet strength of a fibrous exchanger packing useful for heat or moisture exchange in an air conditioning system, said packing comprising corrugations extending from end to end for passage of gases through the packing, comprising wetting said packing body with an aqueous solution of a soluble silicate salt and then exposing said packing, wet with said solution, to a gas reactive with said inorganic salt to precipitate an insoluble silicate, said insoluble silicate providing a reinforcing coating upon the packing surfaces.

2. The method of increasing the wet strength of a fibrous exchanger packing useful for heat or moisture exchange in an air conditioning system, said packing having corrugations extending from end to end for passage of gases through said packing, wetting said packing body with a water soluble solution of an alkali silicate, and then precipitating an insoluble silicate upon the surfaces of said packing by exposing the packing to a gas selected from the group consisting of carbon dioxide and sulfur trioxide reactive with said silicate.

3. The method as defined in claim 2 wherein the soluble silicate is waterglass and the gas is carbon dioxide.

4. The method of increasing the wet strength of a fibrous exchanger packing useful for heat or moisture exchange in an air conditioning system, said packing having corrugations extending from end to end for passage of gases through said packing, wetting said packing body with an aqueous inorganic solution of a water, soluble alkaline earth metal salt and then precipitating an insoluble alkaline earth metal salt upon the surfaces of said packing by exposing the packing to a gas reactive with said solution to form an insoluble alkali earth metal salt.

References Cited
UNITED STATES PATENTS

| | | | |
|---|---|---|---|
| 3,499,812 | 3/1970 | Glav | 117—169 |
| 1,613,758 | 1/1927 | Lindstrom | 117—62 |
| 2,019,852 | 11/1935 | Harrap | 117—62 |
| 2,109,591 | 3/1938 | Lilienfeld | 117—62 |
| 3,202,531 | 8/1965 | Dowd | 117—62 |
| 3,231,409 | 1/1966 | Munters | 117—126 AI |
| 3,377,225 | 4/1968 | Munters | 117—126 AI |
| 3,499,788 | 3/1970 | Glav | 117—126 AI |
| 3,326,701 | 6/1967 | Freyhold | 106—38.35 |
| 128,980 | 7/1872 | Rowland | 117—106 |
| 133,666 | 12/1872 | Richardson | 117—106 |
| 299,571 | 6/1884 | Newton | 117—106 |
| 308,807 | 12/1884 | Schultz | 117—106 |
| 2,883,723 | 4/1959 | Moore et al. | 106—38.35 |

MURRAY KATZ, Primary Examiner

M. SOFOCLEOUS, Assistant Examiner

U.S. Cl. X.R.

117—126 AI, 169 R, A, 106 R; 161—137, 205